United States Patent [19]

Vykukal

[11] Patent Number: 4,678,438

[45] Date of Patent: Jul. 7, 1987

[54] WEIGHTLESSNESS SIMULATION SYSTEM AND PROCESS

[75] Inventor: Hubert C. Vykukal, Los Altos, Calif.

[73] Assignee: The United States of America as represented by the Administrator of the National Aeronautics and Space Administration, Washington, D.C.

[21] Appl. No.: 924,398

[22] Filed: Oct. 29, 1986

[51] Int. Cl.[4] .............................................. G09B 9/00
[52] U.S. Cl. ...................................................... 434/34
[58] Field of Search .......................................... 434/34

[56] References Cited

U.S. PATENT DOCUMENTS

| | | | |
|---|---|---|---|
| 3,010,219 | 11/1961 | Schueller | 434/34 |
| 3,010,220 | 11/1961 | Schueller | 434/34 |
| 3,073,040 | 1/1963 | Schueller | 434/34 |
| 3,516,179 | 6/1970 | Dane | 434/34 |
| 3,534,485 | 10/1970 | Simpson et al. | 434/34 |

OTHER PUBLICATIONS

Popular Science, Feb. 1982; "World's Most Way-Out Job", pp. 72-75.

Primary Examiner—William H. Grieb
Attorney, Agent, or Firm—Darrell G. Brekke; John R. Manning; Robert D. Marchant

[57] ABSTRACT

A weightlessness simulator (10) has a chamber (12) and a suit (56) in the chamber (12). O-rings (26) and valves (30, 38, 42 and 66) hermetically seal the chamber (12). A vacuum pump (32) connected to the chamber (12) establishes a pressure in the chamber (12) less than atmospheric pressure. A water supply tank (34) and water supply line (38) supply a body of water (44) to the chamber (12) as a result of partial vacuum created in the chamber (12). In use, an astronaut enters the pressure suit (56) through port (60), which remains open to ambient atmosphere, thus supplying air to the astronaut during use. The pressure less than atmospheric pressure in the chamber (12) is chosen so that the pressure differential from the inside to the outside of the suit (56) corresponds to the pressure differential with the suit (56) in outer space.

13 Claims, 4 Drawing Figures

WEIGHTLESSNESS SIMULATION SYSTEM AND PROCESS

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

This invention relates to a space simulation system designed to simulate weightlessness. More particularly, it relates to such a simulation system in which disadvantages associated with pressure levels that produce bends are avoided. It also relates to a weightlessness simulation process which is desirably practiced with the system.

2. Description of the Prior Art

It has long been recognized that astronauts should receive training in a weightless or simulated weightless environment before they are sent into outer space. One way that this has been accomplished is by providing a training compartment in an aircraft that flies in a curved trajectory to match the acceleration of a falling body in the Earth's gravity, but this approach allows weightlessness to be achieved for only short periods of time, such as a minute or two, and is very expensive. Another approach that has been suggested in the prior art is to provide a mechanical device giving the astronaut six degree freedom of movement, as disclosed in U.S. Pat. No. 3,516,179, issued June 23, 1970 to Dane.

Simulators for the vacuum environment of outer space are also known in the art. Such simulators are disclosed in, for example, U.S. Pat. No. 3,010,220, issued Nov. 28, 1961 to Schueller and U.S. Pat. No. 3,534,485, issued Oct. 20, 1970 to Simpson et al, but these simulators do not make any provision for the weightlessness of outer space.

More recently, astronauts have been simulating weightlessness on the ground by wearing a pressurized space suit in a pool that appears similar to a large indoor swimming pool. Such a simulator is described in "Self-Contained Neutral-Buoyancy Suit", NASA Tech Briefs, January/February 1986, page 90. The differential pressure between the inside and outside of the space suit must be maintained at the same level that will be employed in outer space for the suit to operate with the same flexibility and handling characteristics that it exhibits in outer space. For the forthcoming space station, that pressure differential has been established as 8.3 PSI, which is measured at the heart in the case of a pool simulation.

When an astronaut performs simulation exercises in a pool, the internal suit pressure must be greater than atmospheric in order to obtain the proper pressure differential. The internal pressure is high enough in this environment so that the astronaut must undergo decompression in the same manner as a diver in order to avoid bends. For safety reasons, a large standby medical/safety team is required whenever such pool simulations are being carried out. While realistic simulation is possible using the pool, extra time and a chamber are required for the decompression, and extra manpower is required for the medical/safety team.

SUMMARY OF THE INVENTION

Accordingly, it is an object of this invention to provide a weightlessness simulator and simulation process which will provide realistic simulation of a weightless environment for substantial periods of time that will allow the astronaut to perform the simulation with a pressure no greater than atmospheric in the space suit at all times.

It is another object of the invention to provide a weightlessness simulator and simulation process using a pool in which it is not necessary for the astronaut to undergo decompression in order to avoid the bends.

It is a further object of the invention to provide such a weightlessness simulator and simulation process using a pool in which there is no need to have a large standby medical/safety team in attendance during the simulation.

The attainment of these and related objects may be achieved through use of the novel weightlessness simulator system herein disclosed. A weightlessness simulator system in accordance with this invention has a chamber and a pressure suit in the chamber. A means is provided for hermetically sealing the chamber. A means is connected to the chamber for establishing a pressure in the chamber less than atmospheric pressure. A means is connected to the chamber for supplying a body of water to said chamber.

In use of the system of this invention, an astronaut enters the pressure suit and a breathable atmosphere is supplied to the pressure suit at a pressure less than atmospheric pressure. The chamber is sealed and a body of water is supplied to the chamber to immerse the pressure suit in the tank. A partial vacuum is established in the chamber. The extent of the partial vacuum is such that the pressure differential between the inside and the outside of the pressure suit in the chamber is equal to the pressure differential that exists between the inside and the outside of such a pressure suit when it is used in outer space. This allows the astronaut to experience a simulated weightless condition with the pressure suit exhibiting its operating characteristics in outer space.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
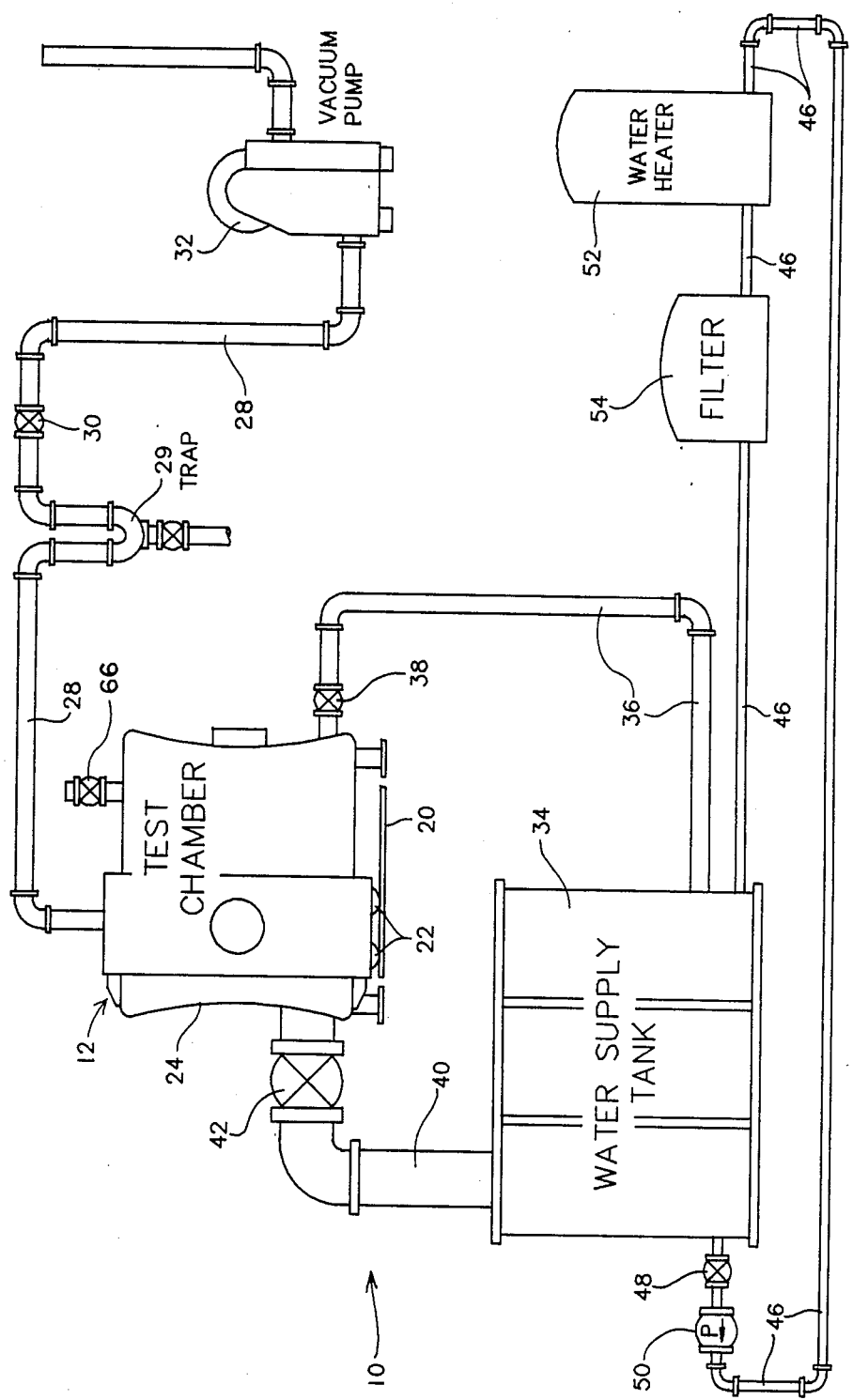
FIG. 1 is a side view of a weightlessness simulation system in accordance with the invention.
Figure 2:
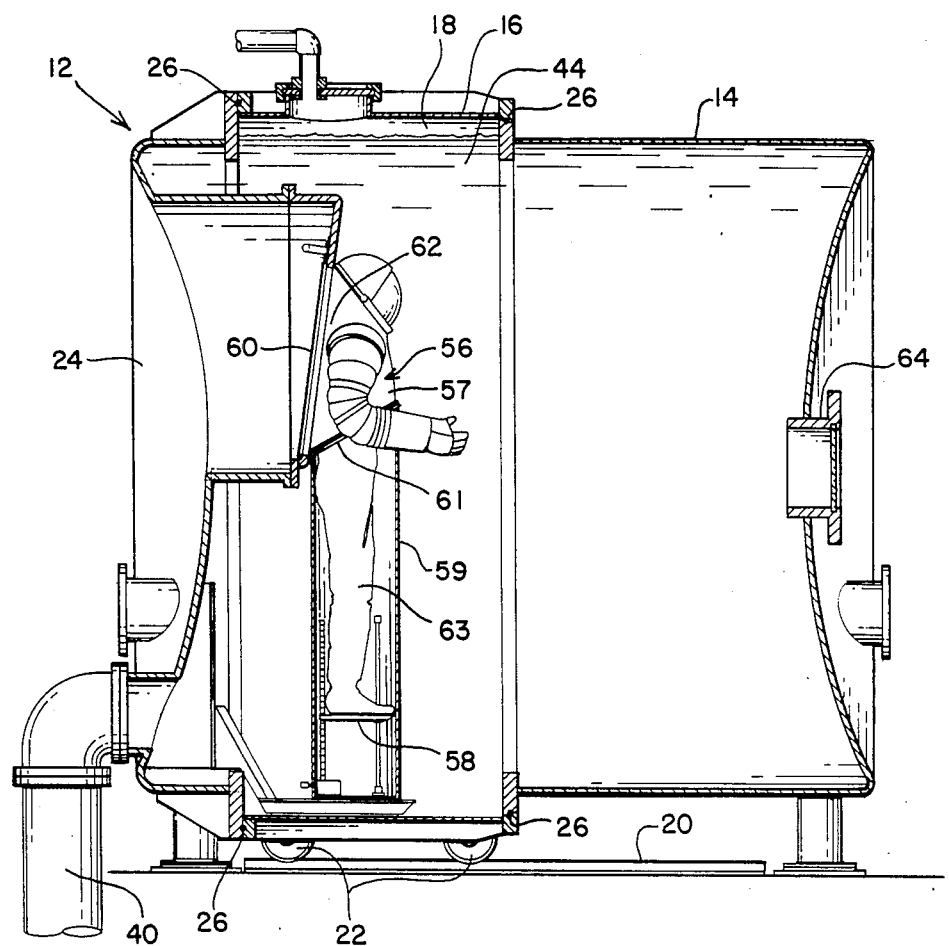
FIG. 2 is a side and partial section view of a portion of the weightlessness simulation system shown in FIG. 1

Turning now to the drawings, more particularly to FIGS. 1 and 2, there is shown a weightlessness simulation system 10 in accordance with the invention. The system 10 includes a chamber 12 that is hermetically sealed during a weightlessness simulation. The chamber 12 is formed from a first cylindrical section 14 and a second cylindrical section 16 which is movable along the first cylindrical section 14 in much the same manner as a conventional collapsable cup, in order to allow access to interior 18 of the chamber 12 (See also FIG. 3). A track 20 and wheels 22 on the bottom of the section 16 facilitate the movement of the section 16 along the section 14. An end 24 completes the enclosure of the chamber 12. The section 16 is sealed against the end 24 and the section 14 by circumferential O-rings 26 between the section 16, the end 24 and the section 14 when the section 16 is in the position shown in FIG. 2 against the end 24. Pipes 28, trap 29 and valve 30 connect the chamber 12 to a vacuum pump 32. A water supply tank 34 is connected to the chamber 12 by water supply pipes 36 and valve 38. Emergency drain pipe 40 and drain valve 42 connect the chamber 12 to the water supply tank 34 in a return flow path. The internal bore of the pipe 40 and the valve 42 are large relative to the bore size of the pipe 36 and the valve 38, in order to allow rapid removal of water 44 from the chamber 12 in the event of an emergency (See also FIG. 3). Pipes 46, valve 48 and pump 50 connect the water supply tank in a recirculating path to water heater 52 and filter 54.

A suit 56 comprising an upper half 57 of a pressure suit of the type employed in space, but modified for use in the chamber 12, and joined to a cylindrical enclosure 59 at flange 61, is positioned inside the tank 12 on a platform 58. The platform 58 is vertically adjustable so that the suit 56 can accomodate different size astronauts 63. The suit 56 is attached to end 24 of the chamber by a port 60, which forms part of the back 62 of the suit upper half 57. The port 60 is provided by modifying an upper half of a pressure suit of the type employed in space. The port 60 remains open at all times during operation of the system 10 in order for an astronaut to enter and leave the suit 56 and to allow atmospheric pressure to be maintained in the suit 56. A viewing port 64 allows observation inside the chamber 12 from outside. A valve 66 allows the chamber 12 to be brought to atmospheric pressure quickly for access to the interior 18 of the chamber 12. Since the chamber 12 and the suit 56 are of conventional construction other than as specifically described above, they will not be described in further detail.

In use of the system 10, with the chamber 12 sealed as shown in FIGS. 1 and 2, a body of water 44 is maintained in the chamber 12 under a reduced pressure in the interior 18 of the chamber. The space suit 56 is maintained in the chamber 12, and the astronaut 63 enters and leaves the space suit 56 through the port 60. Because the port 60 is open to the atmosphere at all times, the astronaut 63 can enter and leave the suit at any time, with no need to undergo decompression. The atmospheric pressure in the suit and the level of reduced pressure in the chamber is desirably such that the pressure differential between the space suit 56 and interior 18 corresponds to the pressure differential encountered in use of the space suit 56 in outer space. Specifications for the space station currently in development provide for a pressure differential of 8.3 PSI, and that differential is desirably employed. The astronaut then performs simulation exercises in the suit 56. The use of the body of water 44 provides a feeling of weightlessness for the astronaut, and the pressure differential of 8.3 PSI duplicates the mechanical movement characteristics of the suit 56 in outer space.

In practice, there is a difference between the pressure differential as encountered in space and the pressure differential created in the system 10, due to the pressure gradient between the top and bottom of the body of water 44. In space, the pressure differential of 8.3 PSI is uniform around the suit. The pressure in the interior 18 of the chamber 12 is preferably established at a level that will give a negative pressure differential with atmospheric pressure at the heart of an astronaut in the suit 56 of 8.3 PSI. Since the suit 56 requires the presence of a greater pressure inside the suit than outside to maintain a hermetic seal at its joints, in no event should the pressure in the chamber 12 rise above a level that will allow such a negative pressure differential to be maintained at the feet of the suit. Given that hydrostatic pressure is equal to the height of water in feet times 0.434 pounds per square inch, if the lowest joint of the suit 56 is never deeper than 8 feet under the surface of the water 44, the hydrostatic pressure at that joint would not exceed 8 times 0.434, or 3.472 pounds per square inch. Thus, the absolute pressure in the chamber 12 above the water 44 may never exceed 11.228 pounds per square inch. Of course, the pressure above the water 44 would usually be kept well below that figure as a margin of safety. While the chamber 12 is reasonably vacuum tight, it should be recognized that the vacuum pump 32 needs to be activated periodically to maintain the reduced pressure in the chamber 12 at the desired level.

Because it is not necessary to use a pressure greater than atmospheric to duplicate these mechanical characteristics, the body of water 44 can be used for the simulation without requiring decompression of the astronaut to avoid the bends. Because no elevated pressure is used in the suit, a medical/safety team is not required to be in attendance when the weightlessness simulation system 10 is used. When the simulation exercises have been completed, the astronaut leaves the suit 56 through the open port 60. Because atmospheric pressure is maintained in the suit at all times, no decompression of the astronaut is required in use of the system 10, which represents a significant advantage over prior art simulations in a water pool.

Figure 3:
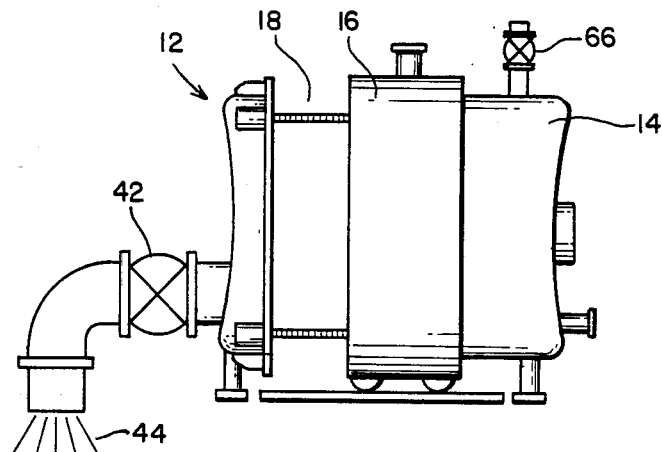
FIG. 3 is a side view of the system portion shown in FIG. 2, but in a different stage of operation.

FIG. 3 shows how an emergency situation is handled with the chamber 12. Should a problem develop, the pressurization valve 66 is opened to bring the interior 18 of the chamber 12 to atmospheric pressure and the drain valve 42 is opened to allow the water 44 to drain into the water supply tank 34 (FIG. 1) quickly. Section 16 is then moved to the right along section 14 to allow access to the interior 18 of the chamber 12.

Figure 4:
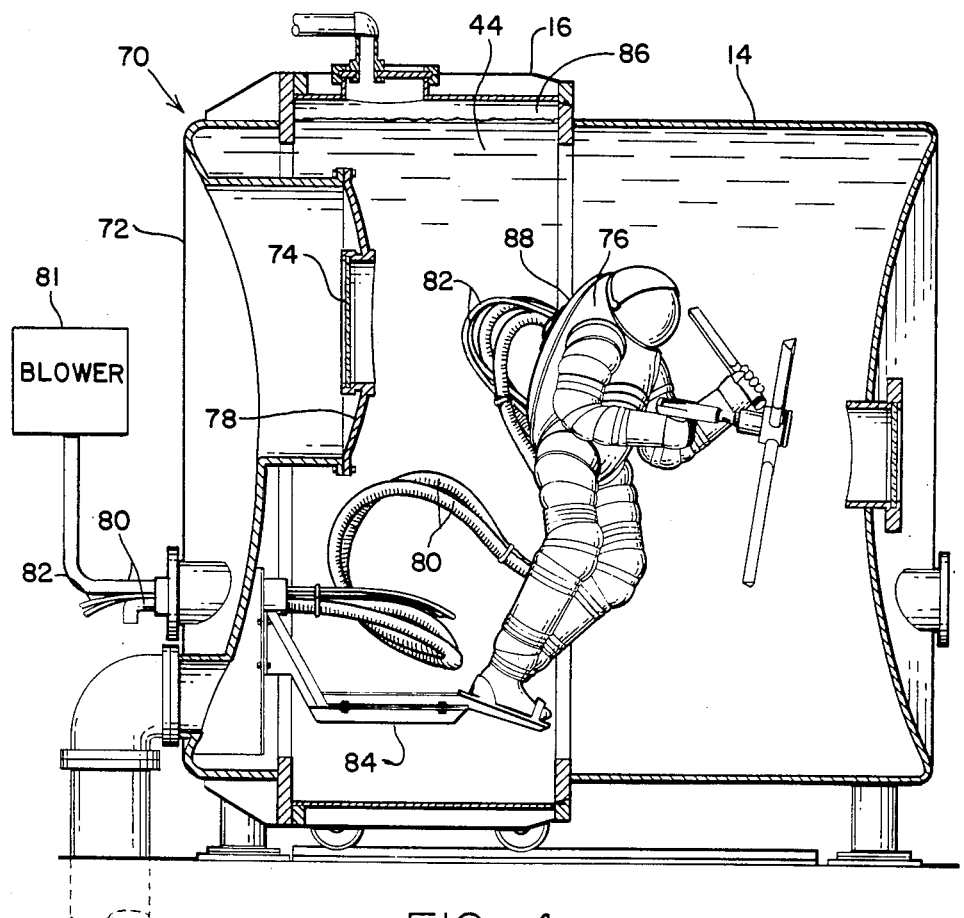
FIG. 4 is a side and partial section view of a portion of another embodiment of a weightlessness simulation system, corresponding to the system portion shown in FIG. 2.

FIG. 4 shows another form of a chamber 70 that can be used in place of the chamber 12 in FIGS. 1 and 2. The chamber 70 includes two cylindrical sections 14 and 16 having the same configuration as the corresponding sections 14 and 16 in FIGS. 1 and 2. End 72 has a conventional viewing port 74, and suit 76 is not attached to wall 78 of the end 72 as in FIGS. 1 and 2. Air and cooling lines 80 and 82 are connected to the suit 76 and pass through the wall 78 of end 72 to sources of air (blower 81) and cooling fluid (not shown). Air line 80 consists of both inlet and outlet lines connected to the blower 81. The suit 76 is attached to a movable platform 84, which allows movement of the suit 76 inside the chamber 70. Water 44 and a reduced pressure in interior 86 are provided in the chamber 70 in the same manner as in FIGS. 1 and 2 when the chamber is used for weightlessness simulation. In order to enter and leave the suit 76, the chamber 70 is opened in the same manner as shown in FIG. 3, and entry and departure is made through an access port 88 on the back of the suit. Other than the provision of the access port 88 and its connections to the lines 80 and 82, the suit 76 is a conventional pressure suit of the type employed in outer space. Other than as shown and described, the construction and operation of the FIG. 4 embodiment is the same as the FIGS. 1-3 embodiment.

It should now be readily apparent to those skilled in the art that a novel weightlessness simulation system and process capable of achieving the stated objects of the invention has been provided. The system and process allow simulation of weightlessness in a body of water without requiring a pressure greater than atmospheric pressure in a space suit used for the simulation. As a result, it is not necessary for an astronaut to undergo decompression after the simulation in order to avoid the bends. A medical/safety team therefore need not be present during the simulation.

It should further be apparent to those skilled in the art that various changes in form and detail of the invention as shown and described may be made. It is intended that such changes be included within the spirit and scope of the claims appended hereto.

What is claimed is:

1. A weightlessness simulation chamber, which comprises a chamber, a suit in said chamber connected to atmospheric pressure, means for hermetically sealing said chamber, means connected to said chamber for establishing a pressure in said chamber less than atmospheric pressure, and means connected to said chamber for supplying a body of water to said chamber.

2. The weightlessness simulation chamber of claim 1 in which said suit is attached to a wall of said chamber, said wall having a port opening into said suit from outside said chamber, said port being configured to allow a user to enter and leave said suit and connecting said suit to atmospheric pressure.

3. The weightlessness simulation chamber of claim 2 in which said suit includes an upper half duplicating mechanical configuration of a pressure suit as employed in space, said port being in said upper half, and a cylindrical lower half joined to said upper half.

4. The weightlessness simulation chamber of claim 3 in which said lower half includes a vertically movable platform configured to allow a user to stand on the platform when inside said suit.

5. The weightlessness simulation chamber of claim 1 in which said water supplying means comprises a water supply tank positioned lower than said chamber, said means for establishing a pressure less than atmospheric pressure in said chamber, a water supply line connected between said water supply tank and said chamber, and a drain connected between said chamber and said water tank, said drain having a large cross-section area relative to said water supply line.

6. The weightlessness simulation chamber of claim 5 additionally comprising a water heater and means for circulating water between said water supply tank and said water heater.

7. The weightlessness simulation chamber of claim 1 in which said means for establishing a pressure in said chamber less than atmospheric pressure comprises a vacuum pump connected to said chamber.

8. The weightlessness simulation chamber of claim 1 in which said chamber is formed from a first cylindrical section and a second cylindrical section, said first cylindrical section being movable along said second cylindrical section to provide access inside said chamber.

9. The weightlessness simulation chamber of claim 1 in which said suit has a supply of breathable gas and a source of cooling fluid connected to said suit through a wall of said chamber.

10. The weightlessness simulation chamber of claim 9 in which said supply of breathable gas comprises a blower for circulating air through said suit, an inlet air line connected between the blower and said suit, and an outlet line connected from said suit through the wall of said chamber.

11. A weightlessness simulation process, which comprises providing a suit in a chamber, putting an individual to experience the simulation in the suit, connecting the suit to ambient atmosphere outside the chamber, and maintaining a body of water in the chamber, and a pressure in the chamber less than atmospheric pressure.

12. The weightlessness simulation process of claim 11 in which the suit is attached to a wall of the chamber and there is an access port to inside the suit at the wall, and the individual is put in the suit through the access port while the suit is in the body of water and the chamber is at the less than atmospheric pressure, and the suit is connected to ambient atmosphere outside the chamber by leaving said access port open to the ambient atmosphere.

13. The weightlessness simulation process of claim 11 in which the individual is put in the pressure suit while the chamber is open, the chamber is sealed, and the body of water and the less than atmospheric pressure is maintained in the chamber after the chamber is sealed.

* * * * *